United States Patent [19]

Morris et al.

[11] 4,273,218
[45] Jun. 16, 1981

[54] FLEXIBLE MOUNTING HUB FOR DISC MEMBER

[75] Inventors: Robert B. Morris, N. Huntingdon; Allen W. Kyllonen, Plum, both of Pa.

[73] Assignee: American Standard Inc., Wilmerding, Pa.

[21] Appl. No.: 20,565

[22] Filed: Mar. 15, 1979

[51] Int. Cl.³ .............................................. F16D 65/10
[52] U.S. Cl. ............................. 188/18 A; 188/218 XL
[58] Field of Search ............. 188/218 XL, 18 A, 71.6, 188/73.2, 264 A, 264 AA; 301/6 WB, 6 E, 6 CS; 192/107 R

[56] References Cited

U.S. PATENT DOCUMENTS

| 2,753,959 | 7/1956 | Johnson | 188/218 XL |
| 3,933,228 | 1/1976 | Otto et al. | 188/218 XL |
| 4,102,443 | 7/1978 | Kohler et al. | 188/218 XL |

FOREIGN PATENT DOCUMENTS

| 1031337 | 6/1958 | Fed. Rep. of Germany | 188/218 XL |
| 1134409 | 8/1962 | Fed. Rep. of Germany | 188/218 XL |

Primary Examiner—Douglas C. Butler
Attorney, Agent, or Firm—R. S. Visk

[57] ABSTRACT

A mounting hub for a brake disc which is concentrically mountable on the hub by a plurality of equi-angularly spaced bolts adjacent the periphery of the hub. Subsequently to mounting of the disc on the hub, the hub is mountable, usually by a pressing process, on one end of an axle. Bolt holes are formed on equi-angularly spaced peripheral arcuate flexible portions of the mounting hub to permit absorption of expansion and distortion of the brake disc mounted thereon.

5 Claims, 1 Drawing Figure

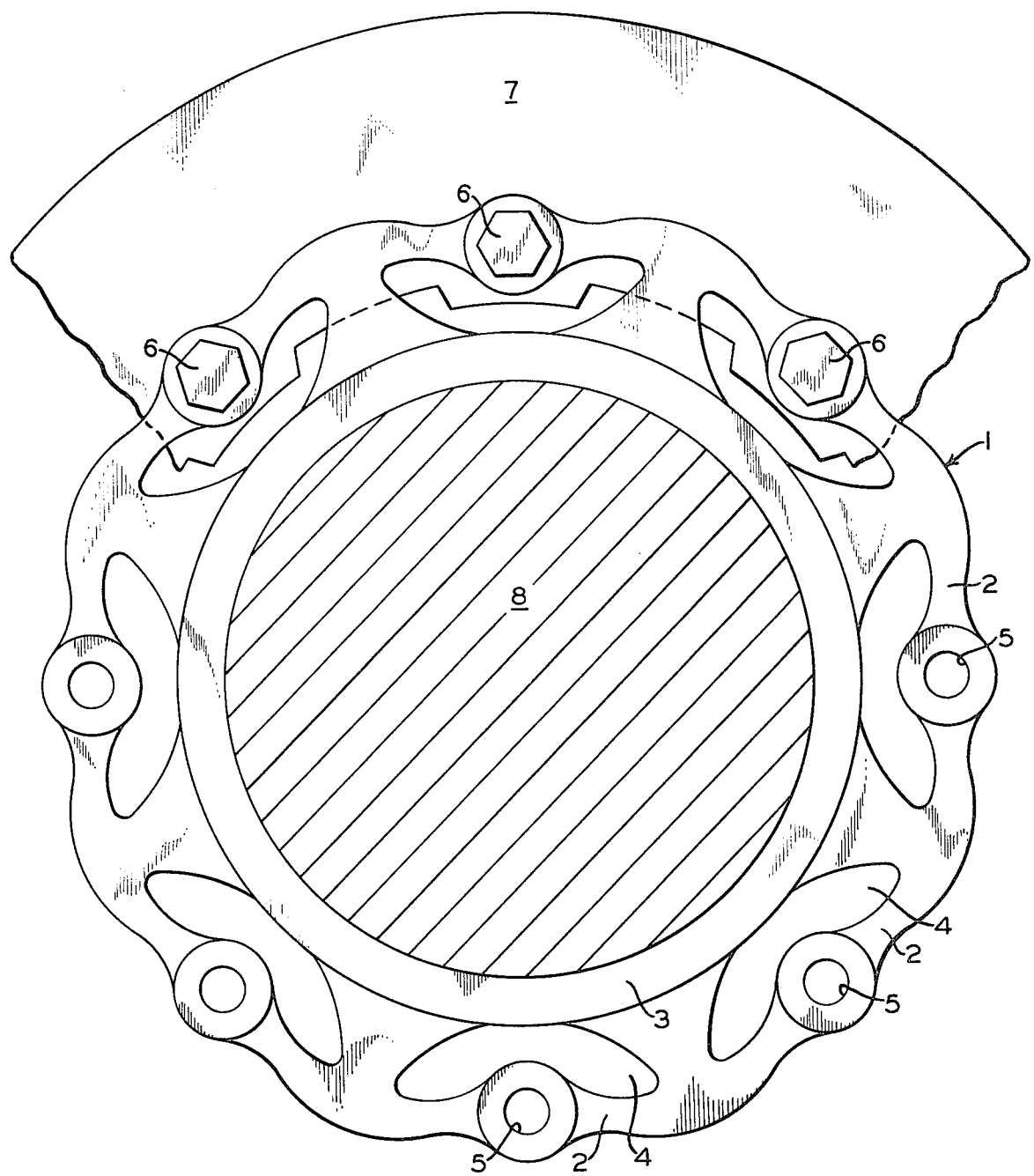

FLEXIBLE MOUNTING HUB FOR DISC MEMBER

BACKGROUND OF THE INVENTION

As is known to those familiar with disc brakes, the relatively high temperatures, to which the disc braking surfaces are subjected during braking, cause considerable expansion and contraction, and consequently, distortion, of the disc which may result in eventual failure. Various methods for accommodating disc expansion and contraction are known, one being to radially elongate the mounting bolt holes, that is, the holes for the bolts by which the disc is secured to the mounting hub. It has been found with this arrangement, however, that the relative movement between the portions of the disc having the elongated holes and the stationary or fixed bolt heads (caused by expansion and contraction of the disc) results in wear between the bolt head and the disc surface, thus resulting in loosening of the bolts and eventual failure of the disc.

SUMMARY OF THE INVENTION

The object of the invention, therefore, is to provide a mounting hub on which a disc member may be rigidly bolted yet provides for absorption of expansion and contraction of the disc member due to heat developed by braking operation.

Briefly, the mounting hub embodying the invention comprises an annular member having a central opening by which the hub may be pressed onto the end of the axle on which the disc brake assembly is carried. The mounting hub has a plurality of equi-angularly spaced bolt holes formed in respective arcuate portions or sectors of the outer periphery of the mounting hub, each of said arcuate sectors being separated from the central hub portion by respective openings radially disposed between the arcuate sectors and said central hub portions. The arcuate sectors are thus provided with flexibility for absorbing expansion and contraction of the disc due to heat from braking operation.

The single FIGURE drawing shows, in outline, a mounting hub shown as pressed on a wheel axle and with a portion of a disc member shown as when mounted thereon.

DESCRIPTION AND OPERATION

An annular mounting hub 1, as shown in the drawing, is provided with a plurality of joining arcuate portions or peripheral segments 2 equally spaced and forming a continuous outer periphery of the mounting hub. Each peripheral segment 2 is radially spaced from a central flange or main body portion 3 of hub member 1 by respective openings 4 radially disposed between each peripheral segment and the main body portion and forming a ring of such openings surrounding said central flange, said openings being angularly spaced apart from each other so as to positionally coincide with the peripheral segments, respectively. Each of the openings 4 is of such shape and dimension as to impart a strip-like shape to each of the peripheral segments 2 and, therefore, certain degree of radial flexibility. Each peripheral segment 2 has a hole 5 centrally formed therein for receiving bolts 6 by which a disc or rotor 7 (only a fragmentary portion of which is shown) is secured to the mounting hub 1. With rotor 7 in place, mounting hub 1, by flange 3, is pressed onto one end of an axle 8 to form part of a disc brake apparatus for a wheel (not shown).

During braking operation, sufficient heat may be generated by friction between brake pads (not shown) and rotor 7, to cause expansion and subsequent contraction of said rotor. Such expansion and contraction of rotor 7 is accommodated by the flexibility of peripheral segments 2 which may flex axially with the rotor. By accommodating distortion of disc 7 caused by expansion and contraction thereof, the novel hub mounting 1 thus prevents failure of the disc.

Having now described the invention, what we claim as new and desire to secure by Letters Patent, is:

1. A hub for mounting a disc brake rotor to a flange member on a vehicle axle, said hub having a plurality of equi-angularly spaced peripheral segments each having a bolt hole formed therein for receiving a plurality of axially aligned bolts by which the rotor is concentrically secured to the hub, said hub being provided with respective opening means radially disposed between each of said peripheral segments and said flange member for allowing radial movement of said segments for accommodating expansion and contraction of the rotor caused by heat generated during braking operations.

2. A hub for mounting a disc brake rotor, as set forth in claim 1, wherein said peripheral segments are arranged in ring-like manner to form the outer peripheral portion of the hub.

3. A hub for mounting a disc brake rotor, as set forth in claim 2, further characterized by a concentric opening surrounded by said flange member by which the hub is mounted on the vehicle axle, said peripheral segments being equi-radially spaced from said flange member.

4. A hub for mounting a disc brake rotor, as set forth in claim 3, wherein each of said peripheral segments is in the form of an arcuate strip-like element integrally joined to the respective adjacent segments on opposite sides thereof.

5. A hub for mounting a disc brake rotor, as set forth in claim 3, wherein each of said peripheral segments is separated from said flange member by said respective openings radially interposed between the segment and the flange member, all of such openings forming a ring of openings surrounding said flange member and being equi-angularly spaced apart from each other so as to radially positionally coincide with the respective peripheral segments, each of said openings being of such shape and dimension as to impart a strip-like shape to each of said segments.

* * * * *